US012720497B2

(12) United States Patent
Chang et al.

(10) Patent No.: US 12,720,497 B2
(45) Date of Patent: Aug. 25, 2026

(54) PRIORITIZATION OF MULTIPLE DISCOVERY RESOURCE TYPES

(71) Applicant: Kyocera Corporation, Kyoto (JP)

(72) Inventors: Henry Chang, San Diego, CA (US); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 307 days.

(21) Appl. No.: 18/287,362

(22) PCT Filed: May 6, 2022

(86) PCT No.: PCT/US2022/028095
§ 371 (c)(1),
(2) Date: Oct. 18, 2023

(87) PCT Pub. No.: WO2022/240681
PCT Pub. Date: Nov. 17, 2022

(65) Prior Publication Data

US 2024/0205800 A1 Jun. 20, 2024

Related U.S. Application Data

(60) Provisional application No. 63/186,556, filed on May 10, 2021.

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/328* (2023.05); *H04W 8/005* (2013.01);
(Continued)

(58) Field of Classification Search
CPC ..... H04W 72/02; H04W 72/40; H04W 8/005; H04W 48/12; H04W 48/16; H04W 88/04; H04W 92/18; H04B 17/328
(Continued)

(56) References Cited

U.S. PATENT DOCUMENTS 12,022,562 B2 6/2024 Yang et al.
12,052,602 B2 * 7/2024 Ali .......................... H04W 4/40
(Continued)

FOREIGN PATENT DOCUMENTS

WO 2021-034166 A1 2/2021
WO 2022-240683 A1 11/2022
(Continued)

OTHER PUBLICATIONS

ETSI TS 138 215 V16.2.0 (Jul. 2020) (Year: 2020).*
(Continued)

*Primary Examiner* — Peter G Solinsky
(74) *Attorney, Agent, or Firm* — Studebaker Brackett PLLC

(57) ABSTRACT

The devices, systems, and methods discussed herein include a first user equipment (UE) device receiving, from a base station, discovery resource pool selection criteria prioritizing a first discovery resource pool over a second discovery resource pool. The first UE device senses whether a congestion level of the first discovery resource pool is above a threshold. When the congestion level of the first discovery resource pool is equal to or less than the threshold, the first UE device selects the first discovery resource pool for discovery transmissions. When the congestion level of the first discovery resource pool is above the threshold, the first UE device selects the second discovery resource pool for discovery transmissions.

13 Claims, 3 Drawing Sheets

(51) Int. Cl.
*H04W 8/00* (2009.01)
*H04W 48/12* (2009.01)
*H04W 48/16* (2009.01)
*H04W 72/40* (2023.01)
*H04W 88/04* (2009.01)
*H04W 92/18* (2009.01)

(52) U.S. Cl.
CPC ........... *H04W 48/12* (2013.01); *H04W 48/16* (2013.01); *H04W 72/40* (2023.01); *H04W 88/04* (2013.01); *H04W 92/18* (2013.01)

(58) Field of Classification Search
USPC .......................................................... 370/252
See application file for complete search history.

(56) References Cited

U.S. PATENT DOCUMENTS

| | | | | |
|---|---|---|---|---|
| 2016/0278003 | A1 | 9/2016 | Kim et al. | |
| 2018/0020339 | A1 | 1/2018 | Agiwal et al. | |
| 2018/0091254 | A1 | 3/2018 | Ryu et al. | |
| 2019/0327724 | A1 | 10/2019 | Zhao | |
| 2019/0335383 | A1 | 10/2019 | Agiwal et al. | |
| 2020/0389900 | A1 | 12/2020 | Lee et al. | |
| 2021/0331701 | A1 | 10/2021 | Hur | |
| 2023/0180097 | A1 | 6/2023 | Zhang et al. | |
| 2023/0284206 | A1 | 9/2023 | Hoang et al. | |
| 2024/0040547 | A1* | 2/2024 | Zhang | H04W 8/005 |
| 2024/0306145 | A1 | 9/2024 | Hoang et al. | |

FOREIGN PATENT DOCUMENTS

| | | | |
|---|---|---|---|
| WO | 2022-240684 | A1 | 11/2022 |
| WO | 2022-240686 | A1 | 11/2022 |

OTHER PUBLICATIONS

Qualcomm Incorporated; "Discussion on relay discovery", R2-2102687; 3GPP TSG RAN WG2 Meeting #113bis-e; Apr. 2, 2021.

CATT; "Discovery for Sidelink U2N Relay", R2-2102698; 3GPP TSG RAN WG2 Meeting #113bis-e; Apr. 2, 2021.

Ericsson; "Left issues for SL discovery", R2-2103000; 3GPP TSG RAN WG2 Meeting #113bis-e; Apr. 2, 2021.

Interdigital Inc.; "Discovery procedure for Sidelink relay", R2-2102806; 3GPP TSG RAN WG2 Meeting #113bis-e; Apr. 2, 2021.

Intel Corporation; "SL Relay Discovery aspects", R2-2103071; 3GPP TSG RAN WG2 #113bis-e; Apr. 2, 2021.

Huawei, Hisilicon; "Support of discovery for sidelink relay", R2-2103493; 3GPP TSG RAN WG2 #113bis-e; Apr. 2, 2021.

ZTE Corporation, Sanechips; "Discussion on remaining issues for sidelink discovery", R2-2100308; 3GPP TSG RAN WG2 Meeting #113-e; Jan. 15, 2021.

OPPO; "Discussion on NR sidelink relay discovery", R2-2103006; 3GPP TSG RAN WG2 #113bis-e; Apr. 1, 2021.

Interdigital Inc.; "Discovery procedure for Sidelink relay", R2-2100522; 3GPP TSG RAN WG2 Meeting #113-e; Jan. 15, 2021.

Interdigital Inc.; "Discovery procedure for SL relay", R2-2009204; 3GPP TSG RAN WG2 Meeting #112-e; Oct. 22, 2020.

* cited by examiner

PRIORITIZATION OF MULTIPLE DISCOVERY RESOURCE TYPES

CLAIM OF PRIORITY

The present application claims priority to Provisional Application No. 63/186,556, entitled "COEXISTENCE HANDLING OF MULTIPLE DISCOVERY RESOURCE TYPES," filed May 10, 2021, which is assigned to the assignee hereof and hereby expressly incorporated by reference in its entirety.

FIELD

This invention generally relates to wireless communications and more particularly to selecting a discovery resource to use for discovery transmissions between wireless communication devices.

BACKGROUND

Sidelink relaying functionality allows a remote user equipment (UE) device that is out-of-coverage (OoC) to connect with the gNB or base station via a relay UE device.

SUMMARY

The devices, systems, and methods discussed herein include a first user equipment (UE) device receiving, from a base station, discovery resource pool selection criteria prioritizing a first discovery resource pool over a second discovery resource pool. The first UE device senses whether a congestion level of the first discovery resource pool is above a threshold. When the congestion level of the first discovery resource pool is equal to or less than the threshold, the first UE device selects the first discovery resource pool for discovery transmissions. When the congestion level of the first discovery resource pool is above the threshold, the first UE device selects the second discovery resource pool for discovery transmissions.

DETAILED DESCRIPTION

Figure 1:
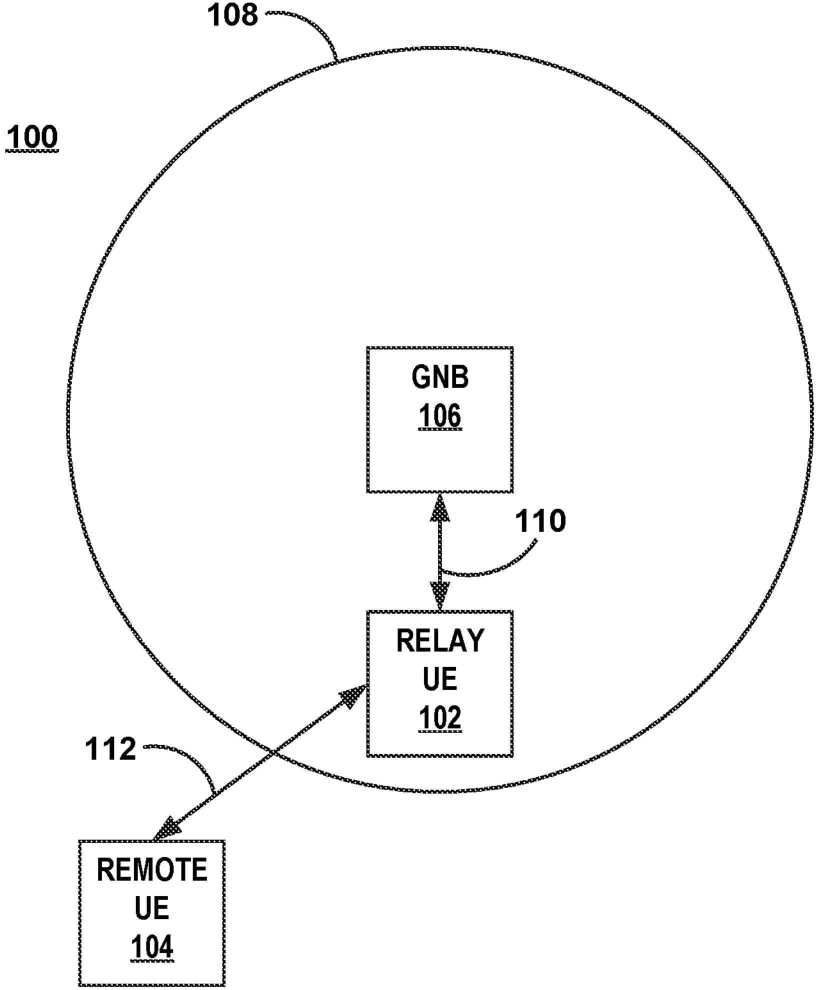
FIG. 1 is a block diagram of an example of a system in which a relay user equipment (UE) device acts as a relay between a base station and a remote UE device.

There are two types of sidelink relaying: UE-to-Network (U2N) relaying and UE-to-UE (U2U) relaying. For U2N relaying, both the relay UE and remote UE may be in coverage of a cell provided by a base station (e.g., gNB), but in other cases, the relay UE is in coverage while the remote UE is out-of-coverage (OoC), as shown in the example of FIG. 1. Therefore, for U2N relaying, the relay UE needs to be in coverage of a cell and connected to the gNB that provides wireless services within the cell. With U2U relaying, there is no such restriction. Thus, for U2U relaying, the relay UE may be in coverage or OoC of the cell.

In the context of U2N relaying, the UEs may use either a Model A or a Model B discovery procedure to discover each other as part of the relay selection and reselection procedure. With the Model A discovery procedure, either the remote UE or the relay UE may announce their presence with a transmission indicating "I am here," and no response is expected. The discovery transmissions that are sent during the Model A discovery procedure are referred to herein as "unsolicited discovery transmissions."

With the Model B discovery, one of the UEs transmits a request asking "Are you there?". The receiving UE may respond to the request by announcing its presence. The discovery transmissions that are sent during the Model B discovery procedure are referred to herein as "solicited discovery transmissions."

One of the important factors in the discovery procedure is the determination of which discovery resource will be used for the discovery transmissions. In general, if the UE device is in coverage of a cell, the discovery resource should be controlled by the gNB that provides wireless services within the cell. If the UE device is OoC, the UE device may use a pre-configured discovery resource.

One of the ways for the gNB to provide a discovery resource is the use of a discovery resource pool, which is a pool of communication resources that have been allocated for UEs to use for discovery transmissions. Both the remote UE and the relay UE may use communication resources from a designated discovery resource pool. The gNB usually provides the discovery resource pool information to the UEs via System Information Block (SIB) (e.g., SIB12) messaging. In some examples, the UEs may utilize sensing to prevent the UEs from all using the same resource within a discovery resource pool.

There are generally two types of discovery resource pools that may be provided to the UEs. For example, the first type of discovery resource pool may be a shared discovery and data resource pool, in which the communication resources may be used for both discovery transmissions and data transmissions. The second type of discovery resource pool is a separate discovery resource pool (e.g., which includes resources to be used only for discovery transmissions) that is separate from a data resource pool (e.g., which includes resources to be used only for data transmissions). In some examples, the network may decide to use only one type of resource pool for discovery. However, in other examples, the network may determine that it is beneficial to simultaneously deploy shared discovery resource pools and separate discovery resource pools since each type of discovery resource pool has its own potential advantages.

For example, with a shared discovery and data resource pool, the network may only need to manage one resource pool that is applicable to both discovery and data transmissions. More specifically, a network that utilizes a single resource pool may advantageously (1) reduce possible resource waste caused by having separate discovery and data resource pools, and (2) reduce the complexity for handling a shared discovery and data resource pool, as well as separate discovery and data resource pools.

There may be different advantages to the network utilizing separate discovery and data resource pools, such as: reduced collisions between data and discovery transmissions; reduced power consumption by having separate power saving schemes since data and discovery have different functionalities (e.g., transmission periodicities); and fixed discovery transmission power may be used without the complex power control required when a shared discovery resource pool is used.

However, if both types of discovery resource pools are deployed in a network, it is necessary for the UEs to understand how to choose between the two types of resource pools. Although there are different solutions to guide the UEs in choosing which discovery resource pool to use, the examples described herein are generally based on the UE prioritizing one type of discovery resource pool, as configured by the gNB. However, if the prioritized discovery resource pool is congested (e.g., as determined by a sensing result that is above a threshold), then the UE can use the other discovery resource pool.

The devices, systems, and methods discussed herein include a first user equipment (UE) device receiving, from a base station, discovery resource pool selection criteria prioritizing a first discovery resource pool over a second discovery resource pool. The first UE device senses whether a congestion level of the first discovery resource pool is above a threshold. When the congestion level of the first discovery resource pool is equal to or less than the threshold, the first UE device selects the first discovery resource pool for discovery transmissions. When the congestion level of the first discovery resource pool is above the threshold, the first UE device selects the second discovery resource pool for discovery transmissions.

Although the different examples described herein may be discussed separately, any of the features of any of the examples may be added to, omitted from, or combined with any other example. Similarly, any of the features of any of the examples may be performed in parallel or performed in a different manner/order than that described or shown herein.

Figure 2A:
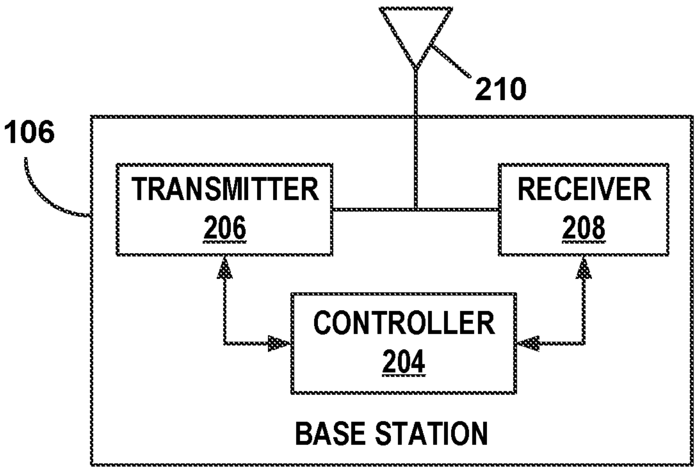
FIG. 2A is a block diagram of an example of the base station shown in FIG. 1.
Figure 2B:
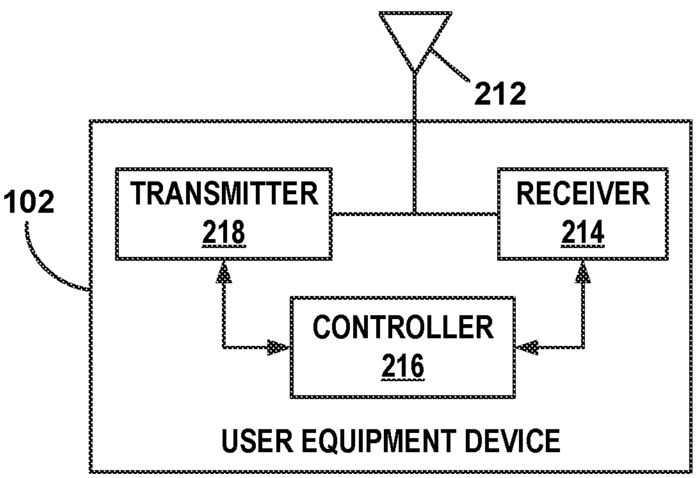
FIG. 2B is a block diagram of an example of the user equipment devices shown in FIG. 1.

FIG. 1 is a block diagram of an example of a system 100 in which a relay user equipment (UE) device acts as a relay between a base station and a remote UE device. In the interest of brevity, FIG. 1 only depicts one relay UE device 102 and one remote UE device 104. However, any number of relay UE devices and remote UE devices may be utilized, in other examples. As shown in FIG. 2B, user equipment device (UE) 102 comprises controller 216, transmitter 218, receiver 214, and antenna 212, as well as other electronics, hardware, and software code. Relay UE device 102 may also be referred to herein as a relay UE or as a relay wireless communication device (WCD). UE 102 is wirelessly connected to a radio access network (not shown) via base station 106, which provides various wireless services to UE 102. For the example shown in FIG. 1, UE 102 operates in accordance with at least one revision of the 3rd Generation Partnership Project 5G New Radio (3GPP 5G NR) communication specification. In other examples, UE 102 may operate in accordance with other communication specifications. For the example shown in FIG. 1, both of the UEs have the same components, circuitry, and configuration as UE 102 from FIG. 2B. However, any of the UEs in FIG. 1 may have components, circuitry, and configuration that differ from UE 102, in other examples.

UE 102 is any fixed, mobile, or portable equipment that performs the functions described herein. The various functions and operations of the blocks described with reference to UE 102 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a user equipment device. An example of a suitable controller 216 includes software code running on a microprocessor or processor arrangement connected to memory. Transmitter 218 includes electronics configured to transmit wireless signals. In some situations, transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the user equipment device functions. The required components may depend on the particular functionality required by the user equipment device.

Transmitter 218 includes a modulator (not shown), and receiver 214 includes a demodulator (not shown). The modulator can apply any one of a plurality of modulation orders to modulate the signals to be transmitted by transmitter 218. The demodulator demodulates received signals, in accordance with one of a plurality of modulation orders.

In the interest of clarity and brevity, only one base station is shown in FIG. 1. However, in other examples, any suitable number of base stations may be utilized. In the example of FIG. 1, base station 106 provides wireless services to UEs within coverage area 108. Although not explicitly shown, coverage area 108 may be comprised of multiple cells. For the example shown in FIG. 1, base station 106, sometimes referred to as a gNodeB or gNB, can receive uplink messages from UE devices and can transmit downlink messages to the UE devices.

Base station 106 is connected to the network through a backhaul (not shown) in accordance with known techniques. As shown in FIG. 2A, base station 106 comprises controller 204, transmitter 206, receiver 208, and antenna 210 as well as other electronics, hardware, and code. Base station 106 is any fixed, mobile, or portable equipment that performs the functions described herein. The various functions and operations of the blocks described with reference to base station 106 may be implemented in any number of devices, circuits, or elements. Two or more of the functional blocks may be integrated in a single device, and the functions described as performed in any single device may be implemented over several devices.

For the example shown in FIG. 2A, base station 106 may be a fixed device or apparatus that is installed at a particular location at the time of system deployment. Examples of such equipment include fixed base stations or fixed transceiver stations. In some situations, base station 106 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 106 may be a portable device that is not fixed to any particular location. Accordingly, base station 106 may be a portable user device such as a UE device in some circumstances.

Controller 204 includes any combination of hardware, software, and/or firmware for executing the functions described herein as well as facilitating the overall functionality of base station 106. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals that will be transmitted and can apply any one of a plurality of modulation orders. The demodulator demodulates any uplink signals received at base station 106 in accordance with one of a plurality of modulation orders.

For the example shown in FIG. 1, base station 106 and relay UE device 102 are connected by Uu link 110, which is the radio interface between a base station and a UE device. Relay UE device 102 and remote UE device 104 are connected by PC5 link 112, which is an interface that allows UEs to communicate directly with each other over a direct channel. Other suitable types of communication links may be utilized in system 100, in other examples.

In operation, relay UE device 102 receives, via its antenna 212 and receiver 214, from base station 106, discovery resource pool selection criteria prioritizing a first discovery resource pool over a second discovery resource pool. In some examples, the first discovery resource pool is a discovery resource pool that is separate from a data resource pool. In other examples, the first discovery resource pool is a shared discovery and data resource pool. Regardless of which discovery resource pool is prioritized, relay UE device 102 receives the discovery resource pool selection criteria via System Information Block (SIB) messaging, in some examples.

Upon receipt of the discovery resource pool selection criteria, relay UE device utilizes its receiver 214 to sense whether a congestion level of the first discovery resource pool is above a threshold. In some examples, the congestion level of the first discovery resource pool is indicated by a Sidelink Channel Busy Ratio (SL-CBR). For these examples, receiver 214 senses (e.g., measures) the received signal strength (e.g., Received Signal Strength Indicator (RSSI)) of signals received on communication resources of the first discovery resource pool. Based on the sensing, relay UE device utilizes its controller 216 to determine the Channel Busy Ratio (CBR), which is the fraction of subframes for which the RSSI exceeds a predetermined signal strength threshold. The sensing measurements are taken over a sliding window that is 100 subframes wide, in some examples. The congestion level of the first discovery resource pool is indicated by the calculated CBR, in these examples.

Based on the congestion level of the first discovery resource pool, relay UE utilizes its controller 216 to select a discovery resource pool for discovery transmissions. When the congestion level of the first discovery resource pool is equal to or less than the threshold congestion level, relay UE 102 selects the first discovery resource pool for discovery transmissions. When the congestion level of the first discovery resource pool is above the threshold congestion level, relay UE 102 selects the second discovery resource pool for discovery transmissions.

In other examples, relay UE 102 determines a first CBR level associated with the first discovery resource pool and a second CBR level associated with the second discovery resource pool. Relay UE 102 compares the first and second CBR levels and selects the discovery resource pool having a lower CBR level. In order to avoid excessive switching between the discovery resource pools, relay UE 102 may be configured to have a maximum number of discovery resource pool reselections during a given time period, in some examples.

In some examples, controller 216 of relay UE 102 is further configured to select a discovery resource pool that is separate from a data resource pool, based on whether remote UE 104 has knowledge of a discovery transmission power that will be used by relay UE 102, regardless of whether the congestion level of the first discovery resource pool is above the threshold. For example, in some cases a shared discovery and data resource pool may be selected to be used for discovery transmissions, but relay UE 102 knows that remote UE 104 is unaware of the discovery transmission power that will be used by relay UE 102 (e.g., when relay UE 102 has not informed relay UE 104 of the discovery transmission power or if the transmission power is not fixed). In these cases, relay UE 102 may be allowed to use the separate discovery resource pool, which should have a fixed transmission power, despite the fact that relay UE 102 may have previously selected a shared discovery and data resource pool. This allowance is important since, in some examples, remote UE 104 may determine which relay UE to select as a relay to the network, based on the signal strength of the discovery transmissions received from one or more relay UEs.

Once controller 216 of relay UE 102 has selected a discovery resource pool, relay UE 102 utilizes its transmitter 218 and antenna 212 to transmit discovery transmissions utilizing the selected discovery resource pool. In some examples, the discovery transmissions are unsolicited discovery transmissions. In other examples, the discovery transmissions are solicited discovery transmissions.

Figure 3:
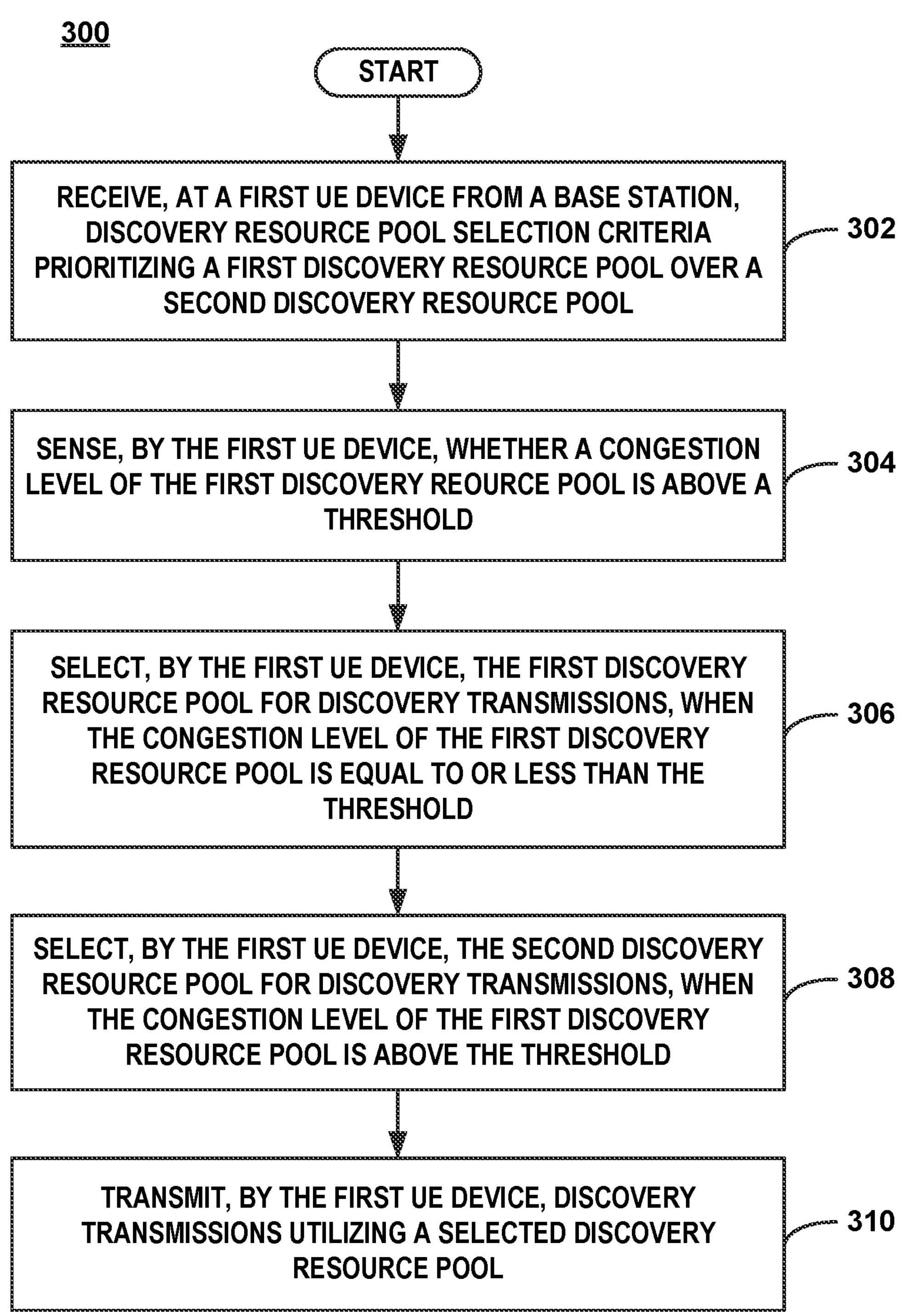
FIG. 3 is a flowchart of an example of a method in which a relay UE device receives, from a base station, discovery resource pool selection criteria prioritizing a first discovery resource pool over a second discovery resource pool. The relay UE device senses whether a congestion level of the first discovery resource pool is above a threshold. The relay UE device selects a discovery resource pool, based on the congestion level, for discovery transmissions.

FIG. 3 is a flowchart of an example of a method in which a relay UE device receives, from a base station, discovery resource pool selection criteria prioritizing a first discovery resource pool over a second discovery resource pool. The relay UE device senses whether a congestion level of the first discovery resource pool is above a threshold. The relay UE device selects a discovery resource pool, based on the congestion level, for discovery transmissions. The method 300 begins at step 302 with receiving, at a first UE device from a base station, discovery resource pool selection criteria prioritizing a first discovery resource pool over a second discovery resource pool. At step 304, the first UE device senses whether a congestion level of the first discovery resource pool is above a threshold. At step 306, the first UE device selects the first discovery resource pool for discovery transmissions, when the congestion level of the first discovery resource pool is equal to or less than the threshold. At step 308, the first UE device selects the second discovery resource pool for discovery transmissions, when the congestion level of the first discovery resource pool is above the threshold. At step 310, the first UE device transmits discovery transmissions utilizing a selected discovery resource pool. In other examples, one or more of the steps of method 300 may be omitted, combined, performed in parallel, or performed in a different order than that described herein or shown in FIG. 3. In still further examples, additional steps may be added to method 300 that are not explicitly described in connection with the example shown in FIG. 3.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A first user equipment (UE) device comprising:

a receiver configured to:

receive, from a base station via System Information Block (SIB) 12 (SIB12) messaging, discovery resource pool information indicating a first discovery resource pool that is a shared discovery and data resource pool including first communication resources used for discovery transmissions and data transmissions and a second discovery resource pool that is a separate discovery resource pool including second communication resources used only for discovery transmissions, and sense first signal strengths of first signals received on the first communication resources and second signal strengths of second signals received on the second communication resources; and a controller configured to:

in response to sensing the first signal strengths of the first signals received on the first communication resources, determine a first congestion of the first communication resources and select first discovery communication resources from the first discovery resource pool for discovery transmissions based on the first congestion, and control the first UE device to perform sidelink discovery using the first discovery communication resources, and in response to sensing the second signal strengths of the second signals received on the second communication resources, determine a second congestion of the second communication resources and select second discovery communication resources from the second discovery resource pool for discovery transmissions based on the second congestion, and control the first UE device to perform sidelink discovery using the second discovery communication resources.

2. The first UE device of claim 1, wherein the second first discovery resource pool is a discovery resource pool that is separate from a data resource pool.

3. The first UE device of claim 1, wherein the first UE device is a relay UE device in-coverage of the base station and the second UE device is a remote UE device out-of-coverage of the base station.

4. The first UE device of claim 1, wherein the first congestion and the second congestion include a Sidelink Channel Busy Ratio (SL-CBR).

5. The first UE device of claim 1, further comprising:

a transmitter configured to transmit the discovery transmissions utilizing a discovery resource pool selected from among the first discovery resource pool and the second discovery resource pool by the controller.

6. The first UE device of claim 5, wherein the discovery transmissions are selected from one of the following: unsolicited discovery transmissions, and solicited discovery transmissions.

7. A method comprising:

receiving, at a first user equipment (UE) device from a base station via System Information Block (SIB) 12 (SIB12) messaging, discovery resource pool information indicating a first discovery resource pool that is a shared discovery and data resource pool including first communication resources used for discovery transmissions and data transmissions and a second discovery resource pool that is a separate discovery resource pool including second communication resources used only for discovery transmissions;

sensing, by the first UE device, first signal strengths of first signals received on the first communication resources and second signal strengths of second signals received on the second communication resources;

in response to sensing the first signal strengths of the first signals received on the first communication resources, determining a first congestion of the first communication resources and selecting, by the first UE device, first discovery communication resources from the first discovery resource pool for discovery transmissions based on the first congestion, and controlling the first UE device to perform sidelink discovery using the first discovery communication resources; and in response to sensing the second signal strengths of the second signals received on the second communication resources, determining a second congestion of the second communication resources and selecting, by the first UE device, second discovery communication resources from the second discovery resource pool for discovery transmissions based on the second congestion, and controlling the first UE device to perform sidelink discovery using the second discovery communication resources.

8. The method of claim 7, wherein the second discovery resource pool is a discovery resource pool that is separate from a data resource pool.

9. The method of claim 7, wherein the first UE device is a relay UE device in-coverage of the base station and the second UE device is a remote UE device out-of-coverage of the base station.

10. The method of claim 7, wherein the first congestion and the second congestion include a Sidelink Channel Busy Ratio (SL-CBR).

11. The method of claim 7, further comprising:

transmitting, by the first UE device, the discovery transmissions utilizing a selected discovery resource pool from among the first discovery resource pool and the second discovery resource pool.

12. The method of claim 11, wherein the discovery transmissions are selected from one of the following: unsolicited discovery transmissions, and solicited discovery transmissions.

13. A computer-readable recording medium having embodied thereon computer-readable codes when, when executed by a processor, cause the processor to perform the method of claim 7.

* * * * *